(12) United States Patent
Wong et al.

(10) Patent No.: US 8,799,213 B2
(45) Date of Patent: Aug. 5, 2014

(54) COMBINING CAPTURE AND APPLY IN A DISTRIBUTED INFORMATION SHARING SYSTEM

(75) Inventors: Lik Wong, Union City, CA (US); Nimar S. Arora, Union City, CA (US); Anand Lakshminath, Fremont, CA (US); Jingwei Wu, Foster City, CA (US); Lei Gao, Foster City, CA (US); Thuvan Hoang, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 922 days.

(21) Appl. No.: 11/831,478

(22) Filed: Jul. 31, 2007

(65) Prior Publication Data

US 2009/0037422 A1 Feb. 5, 2009

(51) Int. Cl.
*G06F 7/00* (2006.01)
*G06F 17/00* (2006.01)

(52) U.S. Cl.
USPC ............................................. 707/610

(58) Field of Classification Search
USPC ............................................. 707/610
See application file for complete search history.

(56) References Cited

U.S. PATENT DOCUMENTS

| | | | |
|---|---|---|---|
| 5,235,700 A * | 8/1993 | Alaiwan et al. | 714/13 |
| 5,418,913 A * | 5/1995 | Fujimoto | 709/213 |
| 5,721,914 A | 2/1998 | DeVries | |
| 5,870,761 A * | 2/1999 | Demers et al. | 1/1 |
| 5,991,771 A | 11/1999 | Falls et al. | |
| 6,029,178 A | 2/2000 | Martin et al. | |
| 6,173,373 B1 | 1/2001 | Bonola | |
| 6,289,343 B1 * | 9/2001 | Freund et al. | 1/1 |
| 6,363,421 B2 | 3/2002 | Barker et al. | |
| 6,553,419 B1 * | 4/2003 | Ram | 709/224 |
| 6,584,477 B1 | 6/2003 | Mosher | |
| 6,662,213 B1 | 12/2003 | Xie et al. | |
| 6,751,573 B1 | 6/2004 | Burch | |
| 6,874,104 B1 | 3/2005 | Josten et al. | |
| 6,889,231 B1 * | 5/2005 | Souder et al. | 1/1 |
| 6,980,988 B1 | 12/2005 | Demers et al. | |
| 7,031,974 B1 * | 4/2006 | Subramaniam | 1/1 |

(Continued)

OTHER PUBLICATIONS

Holzner, "Design Patterns for Dummies", 08 May 2006, John Wiley & Sons, pp. 2-7.*

(Continued)

*Primary Examiner* — Rehana Perveen
*Assistant Examiner* — Huen Wong
(74) *Attorney, Agent, or Firm* — Hickman Palermo Truong Becker Bingham Wong LLP

(57) ABSTRACT

In accordance with an embodiment of the present invention, an information sharing mechanism comprising a memory structure may be provided in a database system. In an embodiment, mined information transferred by a capture process to an associated apply process can be written into the memory structure without taking any latch. Similarly, the mined information can be read by the apply process from the memory structure without taking any latch. The capture and apply processes may work cooperatively to establish a safe point in log mining under various circumstances such as in an initial startup state, in a steady state, in a process restart scenario in the middle of information sharing. In some embodiments, the information sharing mechanism supports both checkpoint-free and checkpoint modes of log mining by the capture process. In addition, both the capture process and the apply process may employ an eager apply approach to increase processing capacity.

28 Claims, 6 Drawing Sheets

(56) References Cited

U.S. PATENT DOCUMENTS

| | | |
|---|---|---|
| 7,130,936 B1 | 10/2006 | Baines et al. |
| 7,219,198 B2 | 5/2007 | Sivaram et al. |
| 7,412,572 B1 | 8/2008 | Shavit et al. |
| 7,533,221 B1 | 5/2009 | Doherty et al. |
| 7,668,878 B2 * | 2/2010 | Arora et al. ............... 707/610 |
| 7,769,714 B2 * | 8/2010 | Lu et al. ................... 707/610 |
| 7,779,418 B2 | 8/2010 | Surlaker et al. |
| 7,783,601 B2 * | 8/2010 | Wong et al. ............... 707/635 |
| 7,801,852 B2 * | 9/2010 | Wong et al. ............... 707/615 |
| 7,856,420 B2 | 12/2010 | Zargham et al. |
| 2002/0059165 A1 | 5/2002 | Hersh et al. |
| 2002/0112009 A1 | 8/2002 | Capers et al. |
| 2002/0144006 A1 | 10/2002 | Cranston et al. |
| 2003/0133214 A1 | 7/2003 | Miller et al. |
| 2005/0120355 A1 | 6/2005 | Kraft et al. |
| 2006/0004876 A1 | 1/2006 | Matsunami et al. |
| 2006/0080394 A1 * | 4/2006 | Goodman et al. ........ 709/206 |
| 2006/0167960 A1 | 7/2006 | Lomet |
| 2006/0187836 A1 * | 8/2006 | Frey et al. ................ 370/235 |
| 2007/0053359 A1 | 3/2007 | Wu et al. |
| 2007/0198788 A1 * | 8/2007 | Hsien et al. .............. 711/159 |
| 2008/0005189 A1 * | 1/2008 | Omura ...................... 707/201 |
| 2008/0027987 A1 * | 1/2008 | Arora et al. .............. 707/104.1 |
| 2008/0228833 A1 | 9/2008 | Kano |
| 2009/0037494 A1 * | 2/2009 | Wong et al. ............... 707/202 |
| 2009/0249356 A1 | 10/2009 | He et al. |
| 2010/0198920 A1 | 8/2010 | Wong et al. |
| 2011/0010392 A1 * | 1/2011 | Wong et al. ............... 707/776 |

OTHER PUBLICATIONS

IBM, "Replication Guide and Reference", 2000, IBM, Version 7.*

U.S. Appl. No. 11/937,414, filed Nov. 8, 2007, Notice of Allowance, Apr. 19, 2010.

U.S. Appl. No. 11/831,447, filed Jul. 31, 2007, Notice of Allowance, May 17, 2010.

* cited by examiner

COMBINING CAPTURE AND APPLY IN A DISTRIBUTED INFORMATION SHARING SYSTEM

This application is related to U.S. patent application Ser. No. 11/831,447, entitled "CHECKPOINT-FREE IN LOG MINING FOR DISTRIBUTED INFORMATION SHARING", filed by LIK WONG et al. on Jul. 31, 2007, and issued as U.S. Pat. No. 7,801,852, the entire contents of which is hereby incorporated by reference for all purposes as if fully set forth herein.

This application is related to U.S. Pat. No. 6,980,988, entitled "METHOD OF APPLYING CHANGES TO A STANDBY DATABASE SYSTEM", filed by Alan J. Demers, et al. on Oct. 1, 2002, the entire contents of which is hereby incorporated by reference for all purposes as if fully set forth herein.

FIELD OF THE INVENTION

The present invention relates to database systems and, more specifically, database systems that support information sharing through log mining.

BACKGROUND

A database system generates redo logs. These redo logs, for example, may record operations belonging to a stream of transactions performed by the database system. Information mined from redo logs can be utilized in a variety of ways. For instance, such information can be utilized for replication, auditing, asynchronous event deliveries, asynchronous change data capture, and database restoration.

Typically, the sharing of mined information from redo logs may be accomplished by using a publisher-subscriber model. In such a model, one or more publisher processes are deployed at one or more source entities (for example, local database systems that are part of the overall distributed database system) to mine the redo logs at the source entities, while one or more subscriber processes are deployed at a target entity (for example, a remote database system that is also a part of the same overall distributed database system) to consume in parallel the results from the publishers. More often than not, in between the publishers and the subscribers, intermediate processes (such as propagation processes) may be used to transfer the results from the publishers to the subscribers. More specifically, under this model, results from mining may be placed in a first staging area at the source entities by the publisher processes. The mining results may be read from the first staging area at the source entities, and transferred to a second staging area at the target entity, by the propagation processes. Finally, the mining results in the second staging area may be accessed, and applied at the target entity, by the apply processes.

Generally speaking, multiple processes may concurrently access the same staging area (such as the second staging area at the target entity) for the purpose of reading and writing into the area. Accordingly, a latch mechanism is typically used for the purpose of coordinating concurrent accesses to such a staging area to prevent incompatible memory accesses by various processes. Since the staging area is a shared resource (which, for example, may be implemented in the form of a shared memory segment) between the multiple processes, interference among the processes may occur. For example, a particular record in the mining results may be locked by a process. As a result, memory space occupied by the particular record may not be available for other uses (such as storing new mining results) or for other processes. Furthermore, all other records that are in the same transaction as the particular record may also have to be resident in the shared memory, since the transaction is not fully applied at the target entity. This problem is exacerbated if there are many long transactions being shared between source and target entities. Memory pressure problems (such as memory spills where demands for memory space exceed the capacity of available primary memory space and data intended to be stored in the primary memory space may thus have to be spilled over to secondary memory space like disk storage) may frequently occur.

Therefore, a better mechanism, which would better support distributed information sharing through log mining, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
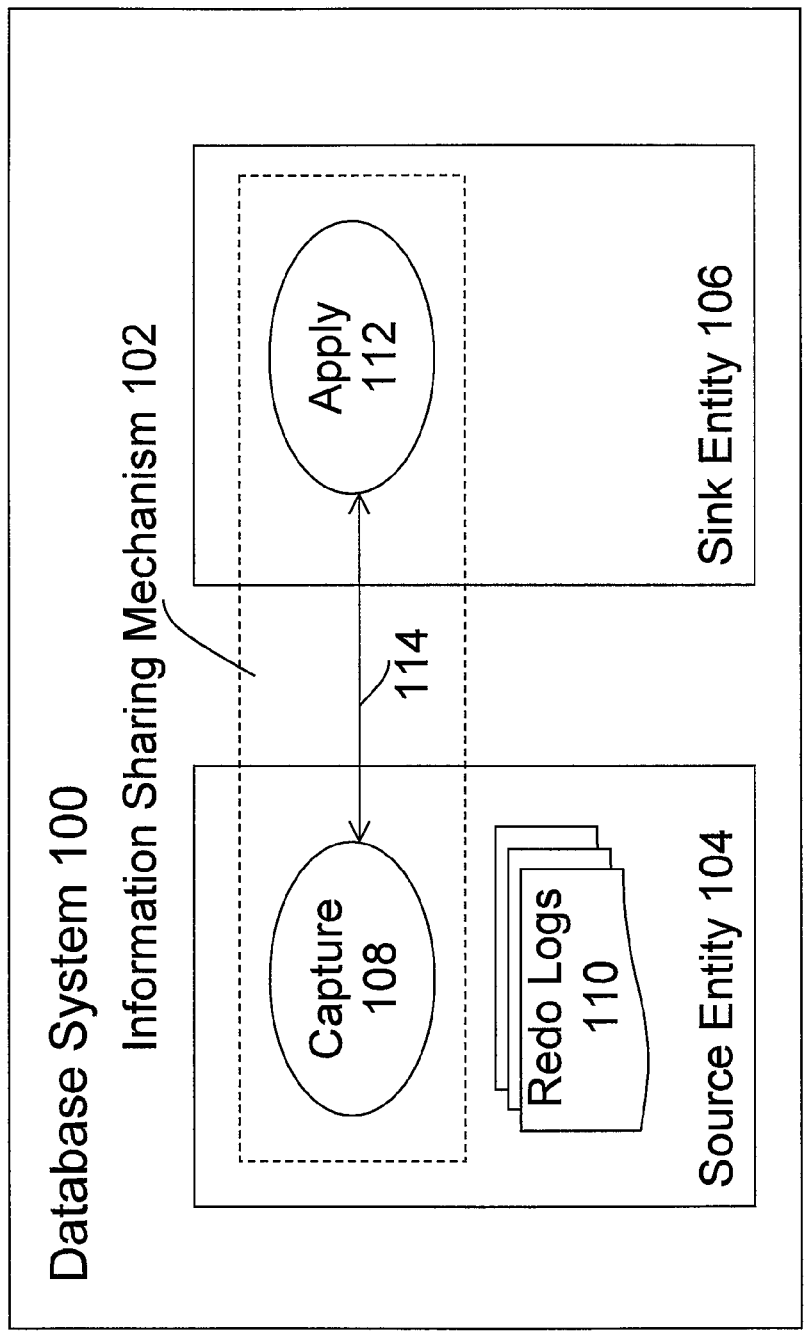
FIG. 1A is a block diagram of an example database system in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In a publisher-subscriber model, capture processes work independently from apply processes that subscribe to redo information mined by the capture processes. As such, when a capture process restarts, an apply process, being only one of many information subscribers, cannot really control where the capture process should restart mining. For one thing, because multiple apply processes subscribe to the information generated by the capture process, each apply process has a different concept on what information has been consumed and what other information has yet to be applied.

In addition, a queuing mechanism may have to be implemented to arbitrate memory accesses among multiple publishers and multiple subscribers involved in the log mining and information sharing. In a situation where a shared memory segment is used to stage published information from the capture processes, latches and various access modes may have to be used to coordinate memory accesses by writers (i.e., the publishers or the capture processes) and readers (i.e., the subscribers or the apply processes).

In the publisher-subscriber model, where a piece of the published information is subscribed by several apply processes, memory space associated with that piece of the published information cannot be freed until all the subscribing apply processes have finished (or consumed) the piece of the published information.

Thus, in a large database system, if transactions are numerous and/or if transactions are long lasting (say weeks or months), memory usage may grow into an unmanageable size over the time.

In accordance with an embodiment of the present invention, an information sharing mechanism may be implemented in a database system. In some embodiments, the information sharing mechanism may comprise a capture process and an apply process that are logically associated, and directly communicate (through a capture proxy process in some embodiments), with each other. As used herein, the term "logically associated" or "directly communicate" means that the capture process and the apply process share overall state information for the log mining and information sharing activities conducted between the two processes.

In this arrangement, the capture process may mine log information at a source entity and transfer the mined information to the associated apply process at a sink entity. In some embodiments, the database system is a distributed database system. Correspondingly, the source entity may be a local database system in the distributed database system and the sink entity may be another local database system in the distributed database system.

As the capture process continuously mines and transfers the log information, the apply process continuously reads and consumes the mined log information published by the associated capture process. In particular, the apply process may apply interesting data changes captured (i.e., mined and transferred) from the source entity to corresponding tables at the sink entity.

The information sharing mechanism uses a memory structure. Reading or writing mined information into the memory structure (or its entries) does not require taking latches. Instead, log mining information transferred by the capture process to the sink entity is received by a capture proxy process that is the only writer of mined information in the memory structure. Likewise, the apply process that is associated with the capture process is the only reader of the mined information stored in the memory structure. Therefore, in this direct communication model, overall speaking, there are only one writer and only one reader (relative to the memory structure) whose types of memory access are different.

Furthermore, in a steady state, because the capture process writes new (i.e., previously unwritten) log information while the apply process reads existing (i.e., previously written) log information, the capture process and the apply process also do not access the same entry in the memory structure. Therefore, not only are the types of memory accesses made by the capture process different, but also the capture process and apply process access different entries (or location) in the memory structure. As a result, there is no need for the information sharing mechanism to use latches for coordinating memory accesses between the capture process and the apply process.

In an embodiment, rule sets may be specified in the database system to define what data changes related to certain database operations and/or certain tables should be mined at the source entity and transferred to and applied at the sink entity. In general, log records of a transaction comprises a start transaction record, zero or more data change records, and an end transaction record. In some embodiments, the database system assigns a monotonically increasing number, known as system change number, to each such record of each such transaction processed by the database system.

Because of existence of the logical association between the capture process and the apply process, the two processes may work cooperatively to establish a safe point for log mining in various states such as in an initial startup state, in a steady state, in a process restart scenario, etc. In these embodiments where system change numbers are assigned to operations in transactions, this safe point may be in the form of a particular system change number in logs (for example, redo logs) to begin mining. In a checkpoint-free mode where start transaction records of transactions are sent by the capture process to the apply process, the particular system change number (SCN) would be a system change number that had been assigned by the database system to a start transaction operation of a particular transaction. In a checkpoint mode where start transaction records of transactions may not be sent by the capture process to the apply process, the particular SCN would be a system change number that has been assigned to the earliest redo record of the particular transaction. Since all redo records before this particular SCN have all been consumed and thus are no longer interesting, this particular SCN may be called the oldest SCN.

In some embodiments, some boundary-guarding sanity algorithms may be implemented by the writer and the reader of the information stored in the memory structure. For example, the capture proxy process may maintain a tail pointer to indicate where to write next in the memory structure, while the apply process may maintain a head pointer to indicate where to currently read. Before writing a new piece of information to the memory structure, the capture proxy process may check to make sure that the tail pointer is, logically speaking, after the head pointer (i.e., the writer's tail pointer does not point to an entry that has information not yet consumed by the reader). Likewise, before reading a new piece of information from the memory structure, the apply process may check to make sure that the head pointer is, logically speaking, before the tail pointer (i.e., the reader's head pointer does not point to an entry that has not been written by the writer). In some embodiments, spill-over algorithms may be used in conjunction with the sanity algorithms to store any overflowed (relative to the memory structure) log information. Note that a spill-over as described herein is not caused by inherent memory access contention involving multiple accessors, but rather due to an overall capacity allocated to the memory structure (thus, this problem, for example, may be avoided or alleviated if the memory structure is configured to have a large size of memory space).

Other than the above-mentioned sanity algorithms, the capture process, the capture proxy process and the apply process may take an eager approach in transferring, writing and reading mined information. For example, as soon as the capture process receives new log information, say a new redo record, through its mining, the new redo record may be immediately transferred to the sink entity. As a result, the capture process does not have to reserve any memory space for this transferred redo record. Similarly, after receiving the transferred redo record from the capture process, the capture proxy process may immediately write, without taking any latch, the new redo record into the memory structure, as long as memory space in the memory structure is sufficient. Correspondingly, the apply process may immediately read and consume, without taking any latch, the new redo record in the memory structure as soon as the record is (fully) written.

Once the new redo record is read from the memory structure, the memory space that stores the new redo record may be immediately marked as free by the apply process or the information sharing mechanism.

Therefore, in this direct communication model, the latency caused by waiting/idling due to latch taking can be avoided. As a result, under this model, redo records can be consumed at a much faster rate than under the publisher-subscriber model. Consequently, even if amounts of memory space used to store redo records may be the same in both models, processing capacity from the same amount of memory space is much larger in the direct communication model than in the publisher-subscriber model.

The mechanism in various embodiments of the invention may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Example System

FIG. 1A illustrates an example database system 100 that comprises an information sharing mechanism 102 for log mining and information sharing between a source entity 104 and a sink entity 106, in accordance with an embodiment of this description. For the purpose of this invention, the database system (100) may be of any type. For example, the database system may be, but is not limited to, a distributed database system that comprises multiple database systems. In such a distributed database system, the source entity (104) may be a local database system while the sink entity (106) may be a remote database system.

As a part of information sharing mechanism 102, a capture process (also known as a mining process) 108 may be deployed at the source entity 104 to mine information in one or more redo logs 110 that record operations belonging to a stream of local transactions performed at the source entity. The information mined from the one or more redo logs (110) may be provided (or transferred) by the capture process (108) to an apply process 112 deployed at the sink entity (106). The apply process (112) is a consumer process for the mined information and may be, but is not limited to, a data replication process.

Direct Communication Model

In an embodiment, when initially starting up, the capture process (108) establishes an association 114 with the apply process (112). This association enables the capture process to communicate with the apply process directly. In contrast to the publisher-subscriber model, the capture and apply processes in accordance with embodiments of this description operate in a direct communication model. As illustrated in FIG. 1, the capture and apply processes may be communicatively coupled through association 114, through which the two processes (i.e., capture and apply) directly communicate state information, log mining information, requests and responses between each other and closely coordinate the overall log mining and information sharing process.

In some embodiments, to provision association 114 between the capture and apply processes, a database administrator sets up configuration files at the source entity and the sink entity to specify any required and/or optional parameters that are to be used by the capture and apply processes for the purpose of establishing the association. For example, IP address or TCP/IP port of corresponding communication parties may be specified. Other parameters including communications and/or application parameters may additionally and/or optionally be specified.

In an embodiment, the association may be established in a transparent manner to a user of log mining and information sharing services. Such a user may be, but is not limited to, a user who uses the information sharing mechanism to replicate at the sink entity human resources data mined from the source entity. In such a transparent manner, the user needs not be concerned with what specific model in which the capture and apply processes operate. The direct communication model may at least support the same services to those implemented in the publisher-subscriber model, for example.

In the direct communication model, the user of the log mining and information sharing services (as in the case of the publisher-subscriber model) simply defines rule sets that specify what information is to be mined at the source entity and transferred to other entities in the database system. The capture process continuously mines the redo logs based on the rule sets specified by the user. The mined information is continuously transferred to the sink entity by the capture process.

Example Memory Structure

In accordance with some embodiments of this description, the mined information in the form of redo (log) records is placed in a memory structure. Specifically, for the memory structure, there is no need to take latch for accessing information stored therein. As used herein, the term "latch" refers to a mechanism that provides coordination to multiple access requesters to a shared resource. In particular, where a resource is shared among access requesters whose access rights to the resource may conflict, a latch usually needs to be taken (or granted) before any such access requester can access the resource. An example of latch may be a lock, a semaphore, etc.

Figure 1B:
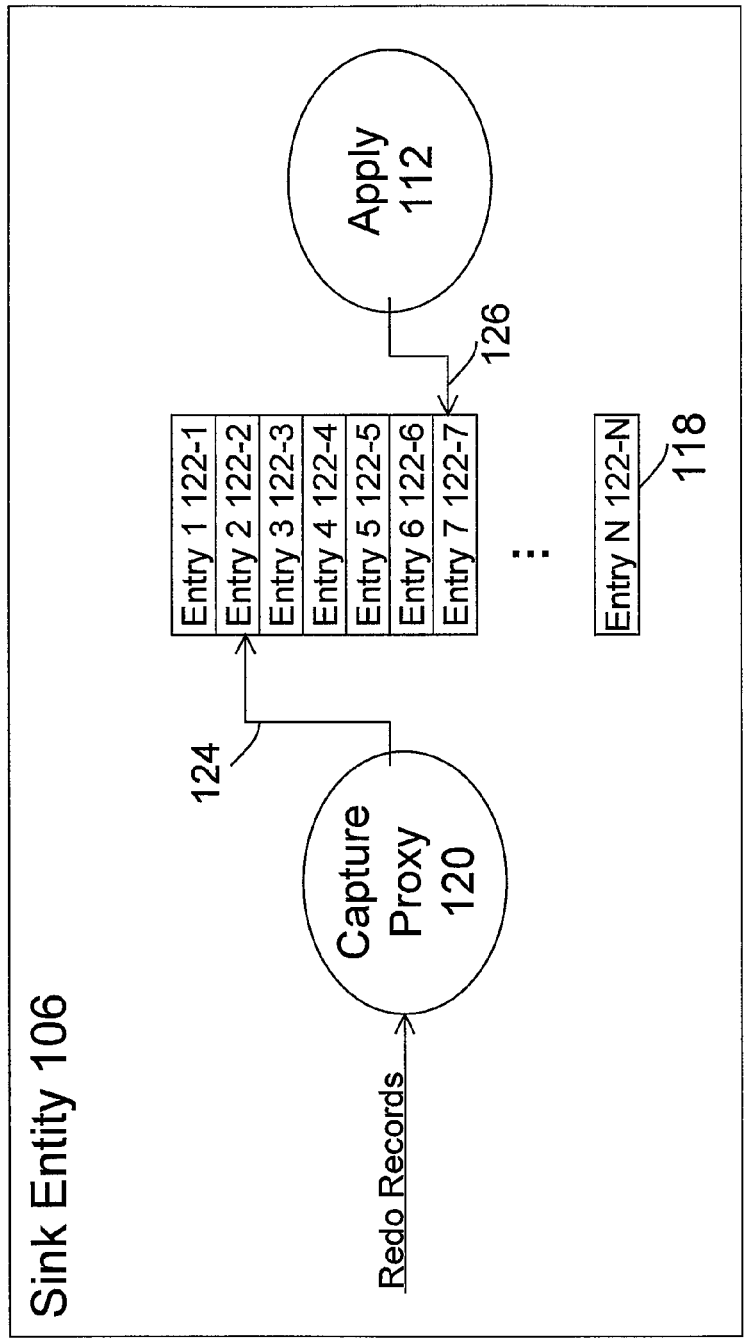
FIG. 1B is a block diagram of an example sink entity that comprises an example memory structure in accordance with an embodiment of the present invention.

FIG. 1B is a block diagram of an example sink entity (such as 106 of FIG. 1A) that comprises an example memory structure 118, an apply process (such as 112 of FIG. 1A) that reads from the memory structure (118), and a capture proxy process 120 that receives redo records from a capture process (108 of FIG. 1A) and writes the received redo records into the memory structure (118), in accordance with an embodiment of the present invention. In some embodiments, capture proxy process 120 and apply process 112 are implemented as separate processes (for example, two separate daemon processes in a UNIX environment). In some embodiments, capture proxy process 120 and apply process 112 are implemented as separate threads of a single process.

As illustrated in FIG. 1B, the memory structure 118 comprises a number of entries 122 (1 through N). In an embodiment, the number (for example, N) of entries 122 is configurable. Each of entries 122 may be used to store a redo record. Since a transaction comprises (and are associated with) multiple redo records, such a transaction may have zero or more of its associated redo records stored in various entries in 122 at a given time.

In some embodiments, each of entries 122 contains a field whose value may indicate whether the entry 122 is free or is currently occupied by a redo record. In some embodiments, the capture proxy process (120) is the only application process that writes redo records to entries 122. Correspondingly, the apply process (112) is the only application process that reads redo records from entries 122.

In some embodiments, capture proxy process 120 maintains a tail pointer 124 that indicates an entry 122, say entry 2 (122-2 as illustrated in FIG. 1B), into which the last records was written. Therefore, when a new redo record is to be written into the memory structure 118, the capture proxy process locates an entry immediately below the entry pointed to by the tail pointer (124). In an embodiment, the capture proxy process (120) may implement a sanity algorithm that determines that the entry below the entry pointed to by the tail pointer (124) is indeed free.

In some embodiments, apply process 112 maintains a head pointer 126 that indicates an entry 122, say entry 7 (122-7 as illustrated in FIG. 1B), into which a record is currently being read by the apply process. Correspondingly, in an embodiment, when the apply process (112) finishes processing with the record (i.e., 122-7), the apply process moves on to a redo record stored in an entry that immediately follows the entry (122-7) pointed to be the head pointer 126. In an embodiment, the apply process (112) may implement a sanity algorithm that determines that the entry below the entry pointed to by the head pointer (124) indeed stores a redo record.

In one embodiment, the memory structure 118 is a circular buffer. Thus, both head and tail pointers may wrap around when entry N is passed. For example, if an entry pointed to by the head pointer is entry N (122-N as illustrated in FIG. 1B), then, after a new redo record is received, the capture proxy process (120) determines if an entry that immediately follows entry N is free. Since the memory structure 118 is a circular buffer, the entry that immediately follows entry N is entry 1 (122-1 as illustrated in FIG. 1B). Therefore, if entry 1 is free, it will be used as the next entry to store the new redo record by the capture proxy process (120).

Likewise, if an entry pointed to by the tail pointer is entry N (122-N as illustrated in FIG. 1B), then, after a redo record in such an entry is consumed or processed, the apply process (112) determines if an entry that immediately follows entry N indeed stores a redo record. Since the memory structure 118 is a circular buffer, the entry that immediately follows entry N is entry 1 (122-1 as illustrated in FIG. 1B). Therefore, the redo record stored in entry 1 will be next consumed or processed by the apply process (112).

Example Logs

Figure 2:
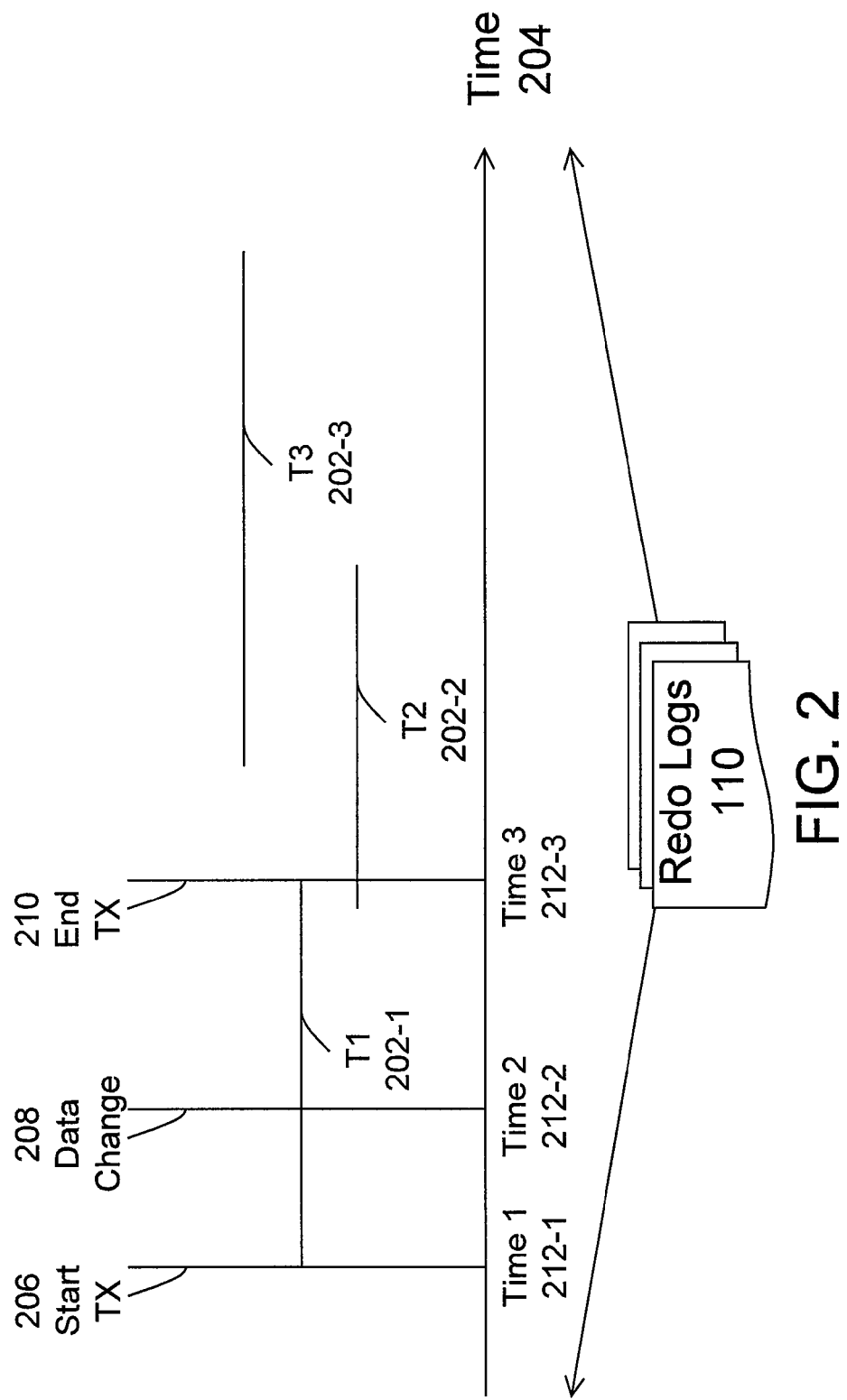
FIG. 2 is a diagram that illustrates example redo logs in accordance with an embodiment of the present invention.

As noted, in some embodiments, the mining of information for the purpose of sharing between entities in a database system such as 100 is performed with redo logs such as 110 illustrated in FIG. 1A. FIG. 2 illustrates example redo logs (such as 110 of FIG. 1A), in accordance with some embodiments of this description. In an embodiment, redo logs 110 (sequentially) records a series of transactions in the database system 100 (for example, local transactions that occur at source entity 104 and distributed transactions that involves data changes at source entity 104), shown as T1, T2 and T3 (i.e., 202-1 through 3), along a time (direction) 204.

Transactions in database system 100 may be executed concurrently. For example, as illustrated in FIG. 2, T1 (202-1) overlaps with T2 (202-2) along time 204. Likewise, T2 (202-2) overlaps with T3 (202-3) along time 204.

In some embodiments, a transaction such as T1 causes three distinct types of information to be stored in redo logs 110. The first type of transaction information stored in redo logs 110 is start transaction information (Start TX 206), which is created at Time 1 (212-1) when T1 comes into existence. The second type of transaction information stored in redo logs 110 is data change information (Data Change 208), which may be created/appended zero or more times depending on how many data change operations involved in the transaction (T1). As illustrated, a data change operation occurs at Time 2 (212-2), which causes database system 100, or its logging facility, to create the data change information (208) as illustrated. The third type of transaction information stored in redo logs 110 is end transaction information (End TX 206), which is created at Time 3 (212-3) when T1 comes to its end.

It should be noted that time 204 is not necessarily the (wall) time at which the capture process or the apply process is running. Rather, time 204 represents a segment of past time that is captured by redo logs 110. In some situations, the capture process and the apply process may share transactional information near real time. That is, information about a transaction is recorded into redo logs 110 in near real time and the mining and sharing of the information also happen near real time. In such situations, the wall time and a particular point of time 204 at which point the capture process is mining information from redo logs 110 may be very close. In other situations, however, the mining and sharing of the information of transactions may happen far behind the wall time at which the transactions actually occur in the database system.

System Change Number

In some embodiments, the capture process (108) mines information from redo logs 110, turns the mined information into redo records, and then transfers the redo records to other communication parties such as the apply process (112). In some other embodiments, the information in redo logs 110 is already in the form of redo records. Thus, the capture process (108) can simply retrieves these redo records as appropriate. Therefore, the term "a redo record in the redo logs" may refer to either a redo record retrieved from redo logs 110 or a redo record derived from information stored in redo logs 110.

Since a transaction 202 comprises a number of operations, based on information stored in the redo logs (110), a redo record may be created for each of the number of operations in the transaction. In one embodiment, each data change operation in a transaction 202 is assigned a unique system change number. In addition, not only data change redo records, but also start transaction and end transaction redo records, may store unique system change numbers that are assigned to their respective operations by the database system (100).

A new system change number is assigned at the time when a new database operation occurs. In some embodiments, a (valid) system change number is a positive (or unsigned) integer that ranges to very large numbers. In a particular embodiment, system change numbers are assigned in a round-robin manner. That is, once the highest ceiling number for system change numbers is reached, the next system change number is assigned from a number that is close to zero. Various algorithms may be employed in the processes of this description to recognize that a very small system change number may be a later-assigned (thus semantically a greater) number than a few system change numbers with very large numbers.

Redo records for a single transaction 202 comprise a start transaction record, zero or more data change records, and an end transaction record. As noted before, system change numbers, in some embodiments, may be assigned to these redo records in a sequentially and monotonically increasing order.

In some embodiments, since both system change numbers (except when they are wrapped around when an very large upper limit such as $2^{32}$ or $2^{64}$ for the system change numbers is reached) and time values increase monotonically, a system change number may logically represent a point in time when the system change number is assigned.

Data Change Records and Read-Only Records

Data change records are associated with the above-mentioned data change operations. As noted, each data change operation may cause change to one or more database records in the database system (100). For example, a data change record in the redo logs (110) may be associated with an insertion operation that inserts a row in a table in the database system (100).

The end transaction record in the redo logs records the end of the transaction (for example, 210 of FIG. 2), such as commit, rollback, abort, etc. Except for commit, the other types of endings of the transaction generally cause the database system (100) to rollback any tentative changes that have been made by the operations associated with (or giving rise to) the data change records. In some embodiments, the apply process may maintain a low water mark (LWM) system change number. In these embodiments, the LWM system change number corresponds to a system change number assigned to an end transaction (i.e., commit/rollback) record of a specific transaction. Any transaction with an end transaction record that is assigned a lower system change number than the LWM system change number or assigned a system change number same as the LWM system change number has been fully consumed and committed by the apply process at the sink entity. In a particular embodiment, transactions comprised in the redo records received by the apply process are committed in the same order as the monotonically increasing order of system change numbers assigned to end transaction records of these transactions.

In some embodiments, a transaction 202 may further comprise a number of read operations that would not cause changes to database records in the database system (100) even if the transaction is committed. In some embodiments, the capture process (108) may treat these read-only redo records in the same way as it treats the data change records. In other words, these read-only records may be transferred, just as data change records are, in these embodiments. In some other embodiments, the capture process (108) may ignore (i.e., not transfer) these read-only redo records.

Without loss of generality of this invention and only for the purpose of illustration, in the discussion hereinafter, redo records may comprise start transaction records, end transaction records, and data change records, as noted before, but not read-only records.

Concurrent Transactions

As noted before, the source entity (104) may have a number of transactions 202 concurrently being processed by the database systems, such as T1 and T2 as illustrated in FIG. 2. As a result, redo records for a number of transactions that wholly or partly overlap with each other in time may be interleaved in the redo logs (110). As a further result, the redo records associated with different system change numbers may also be interleaved in the redo logs (110). However, start transaction records in the redo logs (110) are in a sequentially, monotonically increasing order same as their system change numbers are assigned. Furthermore, end transaction records in the redo logs (110) are also in a sequentially, monotonically increasing order same as the times when their associated transactions are committed.

Steady State

In a steady state, the capture process continuously reads records in the redo logs (110) in the same sequential order as those redo records are written into the redo logs (110). Correspondingly, the redo records are read in the same sequential order as operations associated with the records occur in time. In some embodiments, reading and sending the redo records in the same sequential order as the associated operations occur at the source entity allows the capture process (108) to convey the same semantic information of transactions to the apply process (112) at the sink entity (106).

Interesting Data Change Records

Some of these data change records read by the capture process (108) may be determined as interesting data change records. As used herein, the term "interesting data change records" refers to redo records at the source entity (108) that have information about certain operations on certain tables in the database system (100) such that the certain operations on the certain tables have been specified as interesting to the information sharing mechanism (102). For example, configuration files or rule databases may be used to specify the certain operations on the certain tables are interesting and any redo records on these operations are to be determined as interesting data change records.

Having been so determined, the data change records that are considered as interesting are then transferred by the capture process (108) to the apply process (112) in the association in the same order as they are read. At the other end of the association (114), the apply process (112) generally consumes (or dequeues) these transferable records in the same order as they are transferred. Similarly, the apply process (112) generally commits transactions in the same order as those transactions were committed at the source entity (108). In a particular embodiment, data changes represented by the transferred records may wholly or partially be applied at the sink entity (106).

Persistent System Change Number

In the steady state, the apply process (112) persists a particular system change number. In this example, this particular SCN is a system change number of the earliest redo record in transaction 202 (which may be a start transaction record in the checkpoint-free mode; or which may be a redo record that does not necessarily correspond to a start transaction operation in the checkpoint mode) that has not been completely consumed. In addition, all redo records 202 with lower system change numbers than the particular SCN have been completely consumed and are no longer interesting. A transaction 202 is consumed when the apply process (112) has finished processing with an end transaction record of the transaction. Therefore, since redo records are processed sequentially, where the end transaction record of the transaction has been consumed, all redo records related to the transaction have also been consumed by the apply process (112).

As the apply process (112) continuously consumes interesting records and thus related interesting transactions, this particular SCN will continuously be incremented in the steady state.

Example Transaction Sequence Diagram

Figure 3:
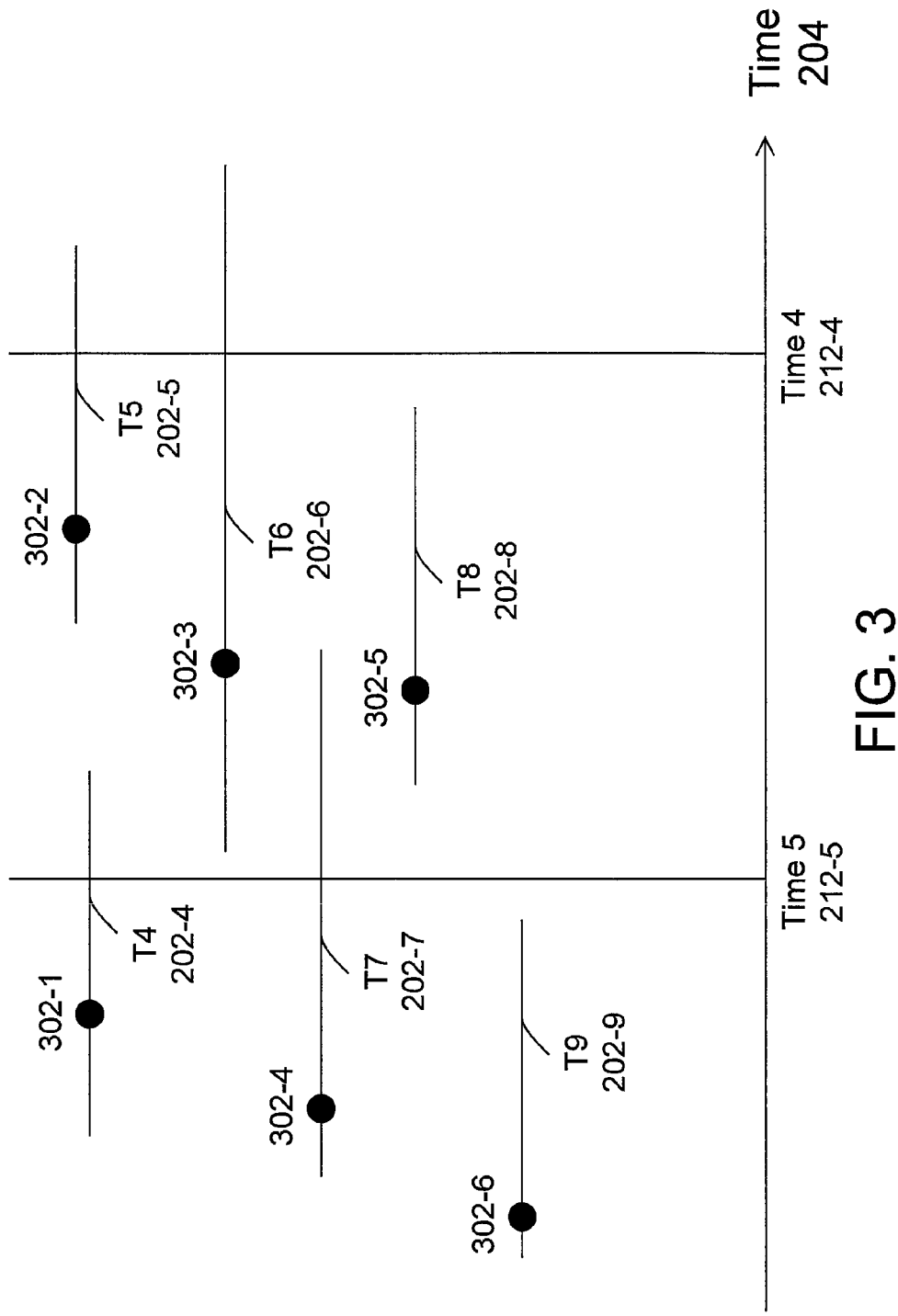
FIG. 3 is an example transaction sequence diagram, according to embodiments of the present invention.

FIG. 3 illustrates an example transaction sequence diagram in accordance with an embodiment of this description. Redo records received by capture proxy process 120 and stored in the memory structure 118 is up to Time 4 (212-4). A redo record that is being consumed by apply process 112 has a system change number that represents Time 5 (212-5) in the redo log time (204). Interesting data change records are indicated by dots 302 (1 through 6 as illustrated).

At Time 5 (212-5), there are two active interesting transactions, namely T4 (202-4) and T7 (202-7). Since the last transaction that has been consumed is T9 (202-9), the persistent SCN maintained by apply process 112 is a system change number that was assigned to the earliest interesting change record, in this case, redo record (or dot) 302-4, of T7. In an embodiment (that operates in the checkpoint-free mode), the persisted SCN is the system change number of a start transaction record of T7.

As log mining and information sharing continuously progress, at some point in runtime, apply process 112 may finish processing one or more later transactions than the transaction that is associated with the persistent SCN. For example, at some point, apply process 112 may reach Time 4 (212-4), i.e., consume all redo records up to a system change number that corresponds to Time 4 (212-4). When apply process 112 reaches Time 4 (212-4), T4, T7 and T8 (202-8) have been fully consumed (that is, apply process 112 has consumed end transaction records for these transactions). Since 302-3 in T6 is the earliest unapplied redo record, a system change number that was assigned to 302-3 becomes a new persistent SCN maintained by apply process 112. In the embodiment (that operates in the checkpoint-free mode), the new persisted SCN is the system change number of a start transaction record of T6.

As noted before, a particular SCN that is assigned to the earliest redo record of a particular transaction is used by the apply process to keep track what redo records are no longer of interest. That is, the particular SCN maintained and made persistent by the apply process indicates that all change records prior to the particular system change number have been applied and thus no longer of interest.

Memory Management

Memory management is simpler in this direct communication model than in the publisher-subscriber model. In the publisher-subscriber model, even there is only one apply process for a capture process, if there is a propagation process connects them, the capture process has to use shared memory for its logical change records so that the propagation process can move them from the capture memory queue to the apply memory queue. Shared memory is more expensive than process private memory. On the other hand, in the direct communication model, since the capture process sends the changes directly to the apply process, shared memory is not required for storing or caching change records.

In the publisher-subscriber model, consumers of redo records do not own memory space (for example, a shared memory segment). Therefore, a queuing mechanism must be implemented to coordinate memory accessed by different consumers such as multiple apply processes. On the other hand, in the direct communication model, there is only one writer (for example, the capture proxy process) and one reader (for example, the apply process). Therefore, in some embodiments, only some sanity algorithms need to be implemented to ensure any occupied entry 122 not to be overrun and any free entry 122 not to be taken as an entry that stores an unconsumed redo record.

Other than implementing the boundary-guarding sanity algorithms, capture process 108, capture proxy process 120 and apply process 112 may take an eager approach in transferring, writing and reading redo records, respectively. For example, as soon as capture process 108 receives a new redo record through its mining, the new redo record may be transferred to the sink entity. Thereafter, the capture process does not have to reserve any memory space for this transferred redo record. In turn, capture proxy process 120 may write the new redo record into an entry 122 without taking any latch, as long as such an entry is still available in the memory structure 118. Correspondingly, apply process 112 may read and consume the new redo record in the entry 122 as soon as it is written, as long as the entry 122 is not a free entry that does not contain an unconsumed redo record. Once the new redo record is read from the memory structure, the entry that stores the new redo record may be immediately marked as free.

Therefore, in this direct communication model, the latency caused by latch taking can be avoided. As a result, under this model, redo records can be consumed at a much faster rate than under the publisher-subscriber model. Consequently, even if amounts of memory space used to store redo records may be the same in both models, processing capacity from the same amount of memory space is much larger in the direct communication model than in the publisher-subscriber model.

Apply Processor Network

In some embodiments, the apply process interfaces with a network of multiple apply processors (which may be implemented in software, hardware, or a combination of the two) for the purpose of processing redo records that have been read out by the apply process (112). Each of the multiple apply processors may be assigned to process a different transaction. Thus, if a particular apply process is assigned to process a particular transaction, then all redo records that are associated with this particular transaction are sent to the particular apply processor by apply process 112. Since multiple apply processors process transactions in parallel, processing capacity at the sink entity with respect to redo records is enhanced by this parallel processing. Furthermore, as there is still only one reader process—i.e., the apply process—that reads out redo records from the memory structure on behalf of all apply processors, this parallel processing of multiple transactions may be performed without incurring memory access contention among the multiple apply processors over the memory structure.

In one embodiment, some apply processors may be standby apply processors to some other active apply processors. In case any of the active apply processors is down, a standby apply processor may take over the processing task. Under this embodiment, the reliability (in terms of fault tolerance and/or high availability) of redo record processing is enhanced.

Spill-Over

Sometimes, apply process 112 may not consume redo records as fast as capture process 108 produces these redo records. For instance, all the apply processors are engaged in processing other transactions. This may happen because there may be a large number of long transactions. Additionally, the memory structure 118 may be configured with a certain number of entries to store redo records from capture process 108.

To relieve memory pressure on the memory structure 118, once all the entries 122 are used up, additional redo records may temporarily be stored in a secondary memory structure. This is known as spill-over. Some fields comprised in the memory structure 118 may contain a flag indicating that a spill-over has occurred. These fields in the memory structure 118 may also store additional pointers to the secondary memory structure that stores the spilled over redo records. In some embodiments, the secondary memory structure may be flash memory, disk space, etc.

Re-Mine Redo Logs

In the publisher-subscriber model where the capture process and apply process are decoupled, it is difficult for the capture process to go back and forth when mining the redo logs. This is because the capture process does not know what the apply process exactly needs once redo records that have been mined from the redo logs are published. The queue that is used to stage logical change records may have spilled some change records into secondary storage. The spilled change records are considered consumed and may have been acknowledged as so to the capture process. As a result, the capture process may withhold from redelivering the spilled change records in the queue, even if the capture process is instructed to re-mine the redo logs.

In the direct communication model, application programming interface (API) may be defined and implemented between the capture and apply processes, whereby the apply process may send a request to the capture process to go back to a specific transaction to begin mining. Alternatively and/or additionally, in one embodiment, API may be provided to the apply process to obtain redo records related to a specific transaction. For example, the apply process may provide to the capture process a specific system change number that has been assigned to a start transaction record of the transaction. These APIs may provide additional capability for log mining and information sharing beyond those provided by the publisher-subscriber model. Furthermore, these capabilities may be used by the capture and apply processes in a manner that is transparent to the user of the log mining and information sharing services.

Apply and Capture Processes Restart

Since the capture process and the apply process can be separate processes (possibly on different machines), the capture process and the apply process may restart asynchronously in the middle of this steady state.

In the publisher-subscriber model, without direct knowledge of an apply (subscriber) process, upon restarting, a capture process has to be conservative for transactions that are active at the restart time, and sends any partial rollback logical change records and commit/rollback redo records for these transactions. Otherwise, the apply process may consume partially rollbacked changes, and never see a commit or rollback of such transactions. Missing the ends (commit/rollback) of transactions would cause data losses and spill storage leak in databases located at the sink entity.

Furthermore, in the publisher-subscriber model, if either the capture process or the apply process may restart, since the capture process does not precisely know what transactions the apply process has completely applied at the sink entity, checkpoints must be taken from time to time so that the capture process may re-position log mining at an appropriate checkpoint in the past.

In the direct communication model, a capture process knows precisely the safe point of restart maintained in an associated apply process. Therefore, in this model, the capture process and the associated apply process may operate either in the checkpoint mode or in the checkpoint free mode. Hence, this model enables checkpoint-free (while the publisher-subscriber model doesn't support checkpoint-free). In addition, the capture process does not need to send any partial rollback logical change records and end transaction records of inflight transactions if the apply process is not interested in them. Therefore, in cases where there are a large number of inflight transactions, the direct communication model will be much more efficient.

Specifically, in the direct communication model where the capture process and the apply process operate in a checkpoint-free mode, since the particular SCN is made persistent by the apply process (112), if the apply process restarts, upon restarting, the apply process can find where to start consuming transferred redo records by simply retrieving the persistent particular system change number. For example, at the time when the capture process (108) and the apply process (112) reestablish their association 114, the particular SCN can be communicated (or notified) to the capture process (108) by the apply process (112). Upon receiving the particular SCN, the capture process (108) may re-position mining from this particular SCN.

Based on the foregoing, in the direct communication model, if an apply process or a database system at the sink entity crashes and recovers to an earlier point in time, the associated capture process may automatically re-position log mining by finding out where to recapture redo records and reconstruct lost messages (that were sent earlier) without user intervention. In the publisher-subscriber model, on the other hand, since the capture process does not communicate directly with the apply process, users may have to query the metadata of the apply process to locate a safe point and inform the associated capture process to recapture the lost messages from the safe point. Such manual user intervention is error prone, to say the least.

Similarly, if the capture process (108) restarts, upon restarting, the capture process reestablish association 114 with the apply process (112). The particular SCN maintained by the apply process (112) is then communicated to the capture process (108). Upon receiving the particular SCN, the capture process restarts mining from the particular SCN.

Switching Models

The capture process (108) and the apply process (112) may already be operating to convey interesting data change records from the source entity (104) to the sink entity (106). However, both processes may still be operating in the publisher-subscriber model or some other model. This is so because, for example, one or both of the capture process and the apply process may be of a prior version of software release that does not support the combine capture and apply optimization (the direct communication model).

In some embodiments, the capture process and the apply process (or rather their respective software modules) may be independently or asynchronously upgraded with respect to each other. Furthermore, in these embodiments, a later released process, be it the capture process or the apply process, is able to detect a software version of its counterpart and acts accordingly. Thus, if the counterpart can only operate the publisher-subscriber model, the later released process will operate that model. However, if the counterpart can operate the direct communication model, the later released process will cooperate with the counterpart and transition to the direct communication model, even if the current operating model is not so.

Even if both the capture and apply processes can run in the direct communication mode, the capture and apply processes may be in different releases. With direct knowledge of its apply process, a capture process can leverage new features and improvements, such as, performance and manageability, without resorting to the least supported release of the apply process or a database system at the sink entity. In the publisher-subscriber model, however, since the capture process does not know version information of the apply process or the database system at the sink entity, the capture process has to assume the least supported release and publish interoperable logical change records for a common least denominator among all releases that support the publisher-subscriber model.

Sample Operation

Figure 4:
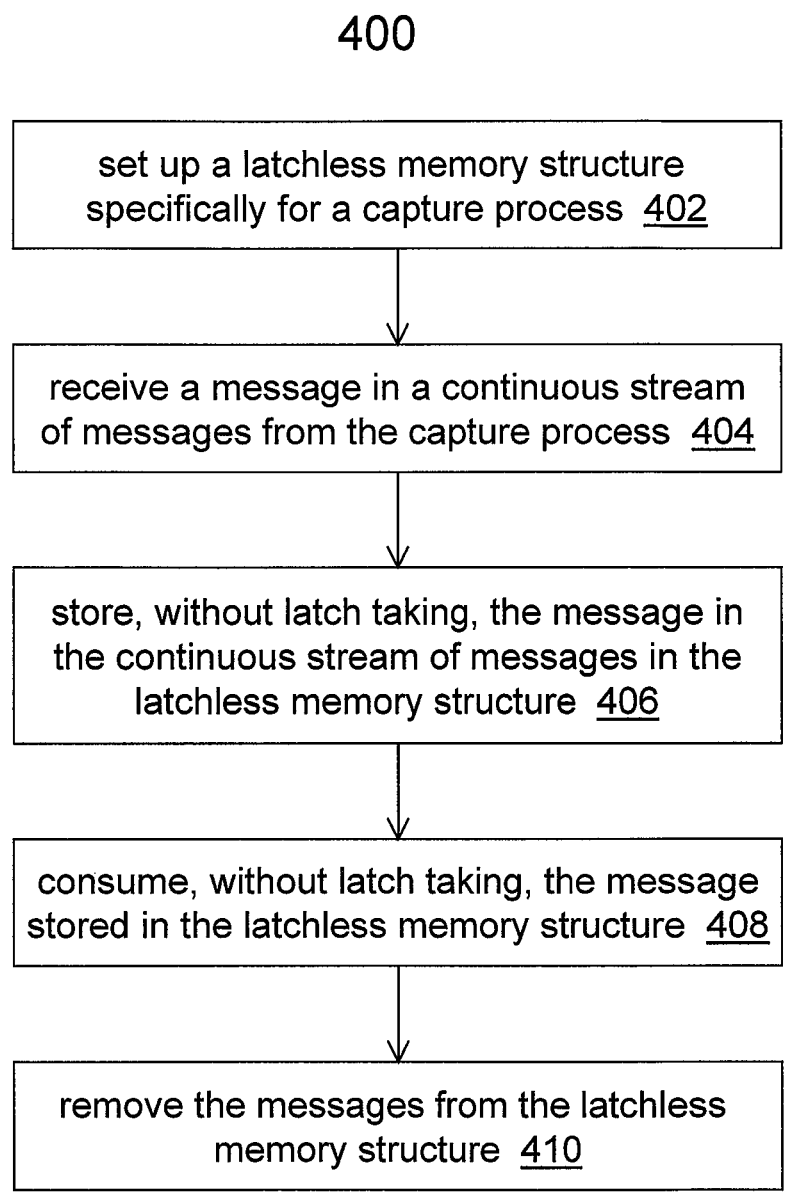
FIG. 4 is an example flow diagram, according to embodiments of the present invention.

FIG. 4 shows a process flow 400 which provides a high level overview of the methodology according to one embodiment of the invention. Initially, in block 402, the information sharing mechanism sets up a memory structure specifically for a capture process. Here, the capture process is remotely located at a source entity and is associated with the apply process at the sink entity. In some embodiments, the source entity is a local database system in a distributed database system, while the sink entity is another local database system in the distributed database system. In some embodiments, the memory structure is a circular buffer that comprises multiple entries.

In some embodiments, the capture process is associated with the apply process through a capture proxy process located at the sink entity. In these embodiments, the capture proxy process maintains a tail pointer to the circular buffer. Additionally and/or optionally, the apply process maintains a head pointer to the circular buffer.

Next, in block 404, the information sharing mechanism (or the capture proxy process as a component module of the information sharing mechanism in some embodiments) receives a message in a continuous stream of messages from the capture process. As noted before, the stream of messages comprises interesting logical change records continuously captured at the source entity by the capture process. In some embodiments, the message contains a redo record that has a system change number.

In some embodiments, in block 406, the capture proxy process stores, without taking any latches on the memory structure, the message in the continuous stream of messages in the memory structure. In some embodiments, before the capture proxy process stores the message, the information sharing mechanism may determine whether the memory structure has memory space to store the message. In response to determining that the memory structure does not have memory space to store the message, the information sharing mechanism causes the message to be written in a secondary memory structure, instead of the memory structure. In various embodiment, the secondary memory structure may be located in hard-disk, flash, RAM, etc. In another embodiment, instead of writing into the secondary memory structure, the capture proxy process may be blocked until the apply process has consumed some change records and make some memory in the (non-secondary) memory structure available.

Subsequently, in block 408, the apply process consumes, without taking any latches on the memory structure, the message among one or more messages that are stored in the memory structure. Here, the one or more messages are part of the continuous stream of messages. In some embodiments, when consuming a message, the apply process identifies a transaction of which the message is a part, then determines an apply processor (among a network of apply processors) to process the transaction. When such an apply processor is located or assigned, the apply process forwards the message to the apply processor.

Once the message is consumed, in block 410, the information sharing mechanism removes the messages from the memory structure.

Because of the direct association between the capture process and the apply process, not only sequential log mining may be conducted between the two associated processes. When there is a need to re-position log mining to start from a different transaction at a different point in time in the redo logs, the apply process may send a request to the capture process to start mining logs at a particular logical time. Here, the particular logical time corresponds to a specific system change number that was assigned to the earliest redo record of a particular transaction and wherein the specific system change number is indicated in the request. Accordingly, the apply process may receive one or more redo records that begins at the earliest redo record of the particular transaction from the capture process.

For the purpose of illustration, the mining process, i.e., the capture process, has been described as located at the source entity. It should be noted that this is for illustration purposes only. For example, such a capture process can also run in another entity other than the source entity. In particular, an entity separate from the source entity and the sink entity may be designated as a mining entity. The redo logs in the source entity may be shipped to the mining entity. The capture process running at the mining entity may mine the redo logs received from the source entity and sends interesting changes to the sink entity. In addition, the sink entity may be the same as the mining entity. Thus, these and other variations of where the redo logs are mined are within the scope of this description.

For the purpose of illustration, each database change has been described as associated with a database operation, and each database operation has been described as associated with a data change record with an assigned system change number. It should be noted that this is for illustration purposes only. For the purpose of this description, other ways of association among database changes, database operations, data change records and system change numbers may be used. For example, the capture process may group multiple database changes (which may be caused by one or more data operations) into one data change record. For example, within such a data change record, the multiple database changes may be stored in a chained row or a linked list. The capture process may also break one large database change (for example, a change involving Large Object, or LOB) to multiple smaller data change records. The capture process may assign an overall system change number to the smaller data change records, but each of the smaller data change records may also be assigned to a subsequence number to differentiate amongst them. Thus, these and other variations of how database changes may be grouped into data change records are within the scope of this description.

For the purpose of illustration, it has been described that, when a redo record is consumed, the redo record is also applied to (the database system) at the sink entity. Furthermore, it has been described that the consumption of a redo record occurs at the time when the redo record is removed from the memory structure. It should be noted that this is for illustration purpose only. For the purpose of this description, other meanings of the term "consumed" may also be appropriate in various embodiments.

For example, when the apply process consumes a redo record from the memory structure, the apply process does not really have to consume such a record. It may mean that the apply process has moved the record from the memory structure to some other memory. In some embodiments, the apply process groups redo records by transactions and apply transactions by transactions. In a particular embodiment, once a transaction is applied, then all associated redo records for this transaction is consumed. If the transaction is too big to fit into memory, the apply process may spill the transaction's redo records over to disk (this spill-over for a transaction is independent of the spill-over related to the capacity of the memory structure as previously discussed). If a redo record is spilled, the record may be considered consumed, nonetheless. In an alternative embodiment, the apply process does not have to stage all redo records for a transaction before beginning to apply the transaction. Instead, the apply process can apply whatever redo record it has for a given transaction before seeing an end transaction record of the given transaction. This is called eager apply. In such an embodiment, the apply process may discard a redo record once thus applied, without waiting for the given transaction to be completely applied. In case of failure, the transaction may be roll-backed (when a rollback type of an end transaction record is found). As noted, the capture process can also re-mine from a safe point in the redo logs to re-deliver the redo records, if necessary. This direct communication model enables eager apply. In the publisher-subscriber model, however, when the apply process applies (not spills) a redo record, but not the whole transaction, it cannot discard the record from memory space under the control of a queue. Otherwise, the queue may not re-deliver such a record. This is one of the key differences between the publisher-subscriber model and the direct communication model.

Hardware Overview

Figure 5:
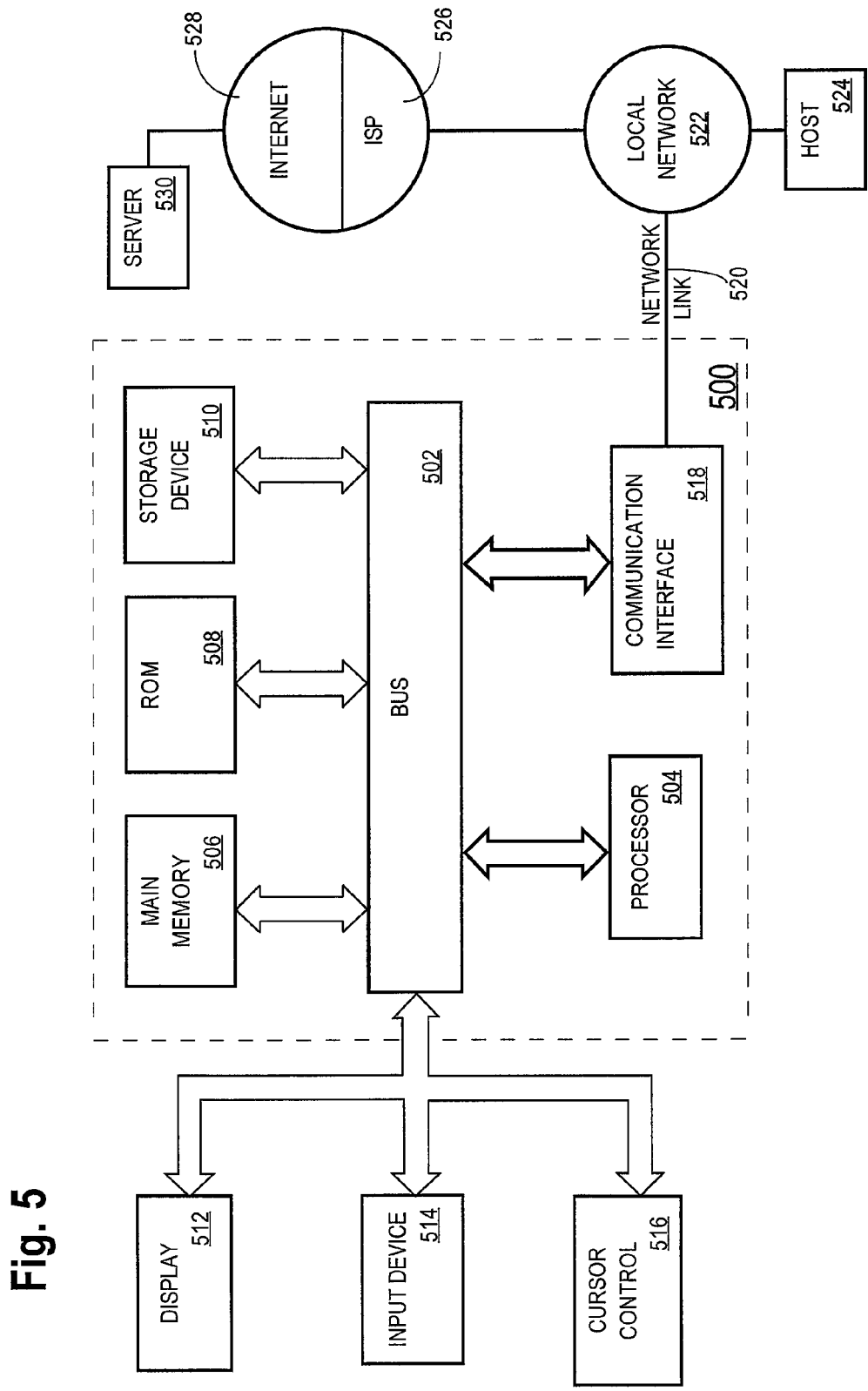
FIG. 5 is a block diagram of a system upon which the techniques described herein may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   a capture process on a source node creating a stream of messages including a plurality of logical change records, of a source database, mined from transaction logs at said source node;
   a destination node setting up a memory structure on said destination node, wherein said capture process on said source node adds all of said plurality of logical change records into said memory structure by way of a single capture proxy process on said destination node, and wherein a single apply process on said destination node receives said all of said plurality of logical change records by way of said memory structure;
   said capture process sending said plurality of logical change records in said stream of messages to said single capture proxy process on said destination node;
   said single capture proxy process receiving said plurality of logical change records in said stream of messages from said capture process;
   upon receiving said plurality of logical change records, said single capture proxy process, without taking a latch for adding said plurality of logical change records to said memory structure, adding said plurality of logical change records in said stream of messages from said capture process to said memory structure on said destination node;
   while said single capture proxy process is concurrently adding more logical change records to said memory structure, said single apply process, without taking a latch for changing said plurality of logical change records from said memory structure, retrieving said plurality of logical change records from said memory structure and marking said plurality of logical change records;
   wherein the method is performed by one or more computing devices.

2. The method of claim 1, wherein the source node is a local database system in a distributed database system and wherein the destination node is another local database system in the distributed database system.

3. The method of claim 1, wherein the memory structure is a circular buffer that comprises multiple entries.

4. The method of claim 3, wherein the capture process is associated with the single apply process through the single capture proxy process located at the destination node.

5. The method of claim 4, wherein the single capture proxy process maintains a tail pointer to the circular buffer.

6. The method of claim 4, wherein the single apply process maintains a head pointer to the circular buffer.

7. The method of claim 1, wherein a message in said stream of messages contains a redo record that has a system change number.

8. The method of claim 1, further comprising:
   identifying a transaction of which a message in said stream of messages is a part;
   determining an apply processor to process the transaction; and
   forwarding the message to the apply processor.

9. The method of claim 1, further comprising:
   determining whether the memory structure has memory space to store a message; and
   in response to determining that the memory structure does not have memory space to store the message, writing the message in a secondary memory structure.

10. The method of claim 1, further comprising:
    the single apply process sending a request to the capture process to start mining logs at a particular logical time, wherein the particular logical time corresponds to a specific system change number that was assigned to a particular transaction record of a particular transaction, wherein the particular transaction record is the earliest record received by the single apply process of the particular transaction, and wherein the specific system change number is indicated in the request; and
    the single apply process receiving one or more redo records that begins at the start transaction record of the particular transaction from the capture process.

11. The method of claim 1, wherein the capture process avoids taking checkpoints when capturing the interesting logical change records from one or more logs at the source node.

12. The method of claim 1, further comprising:
    reestablishing an association between the single apply process and the capture process after the single apply process restarts at the destination node;
    sending, by the single apply process, a particular system change number to the capture process, wherein the single apply process retrieves the particular system change number from a persistent data store and wherein the particular system change number indicates the lowest value for all subsequent system change numbers; and
    receiving, from the capture process, one or more messages that contain one or more interesting logical change records captured at the source node, wherein each of the one or more interesting logical change records carries a system change number that is no less than the particular system change number.

13. The method of claim 1, further comprising:
reestablishing an association between the single apply process and the capture process after the capture process restarts at the source node;
sending a particular system change number to the capture process, wherein the single apply process stores the particular system change number as the lowest value for all subsequent system change numbers; and
receiving, from the capture process, one or more messages that contain one or more interesting logical change records captured at the source node, wherein each of the one or more interesting logical change records carries a system change number that is no less than the particular system change number.

14. The method of claim 1, wherein the step of marking said plurality of logical change records is performed before a transaction that is associated with a message in said stream of messages is consumed at the destination node.

15. A volatile or non-volatile computer-readable medium carrying one or more sequences of instructions which, when executed by one or more processors, causes the one or more processors to perform:
a capture process on a source node creating a stream of messages including a plurality of change records, of a source database, mined from transaction logs at said source node;
a destination node setting up a memory structure on said destination node, wherein said capture process on said source node adds all of said plurality of logical change records into said memory structure by way of a single capture proxy process on said destination node, and wherein a single apply process on said destination node receives said all of said plurality of logical change records by way of said memory structure;
said capture process sending said plurality of logical change records in said stream of messages to said single capture proxy process on said destination node;
said single capture proxy process receiving said plurality of logical change records in said stream of messages from said capture process;
upon receiving said plurality of logical change records, said single capture proxy process, without taking a latch for adding said plurality of logical change records to said memory structure, adding said plurality of logical change records in said stream of messages from said capture process to said memory structure on said destination node;
while said single capture proxy process is concurrently adding more logical change records to said memory structure, said single apply process, without taking a latch for changing said plurality of logical change records from said memory structure, retrieving said plurality of logical change records from said memory structure and marking said plurality of logical change records.

16. The medium of claim 15, wherein the source node is a local database system in a distributed database system and wherein the destination node is another local database system in the distributed database system.

17. The medium of claim 15, wherein the memory structure is a circular buffer that comprises multiple entries.

18. The medium of claim 17, wherein the capture process is associated with the single apply process through the single capture proxy process located at the destination node.

19. The medium of claim 18, wherein the single capture proxy process maintains a tail pointer to the circular buffer.

20. The medium of claim 18, wherein the single apply process maintains a head pointer to the circular buffer.

21. The medium of claim 15, wherein a message in said stream of messages contains a redo record that has a system change number.

22. The medium of claim 15, wherein the one or more sequences of instructions further comprise instructions which, when executed by one or more processors, causes the one or more processors to perform:
identifying a transaction of which a message in said stream of messages is a part;
determining an apply processor to process the transaction; and
forwarding the message to the apply processor.

23. The medium of claim 15, wherein the one or more sequences of instructions further comprise instructions which, when executed by one or more processors, causes the one or more processors to perform:
determining whether the memory structure has memory space to store a message; and
in response to determining that the memory structure does not have memory space to store the message, writing the message in a secondary memory structure.

24. The medium of claim 15, wherein the one or more sequences of instructions further comprise instructions which, when executed by one or more processors, causes the one or more processors to perform:
the single apply process sending a request to the capture process to start mining logs at a particular logical time, wherein the particular logical time corresponds to a specific system change number that was assigned to a particular transaction record of a particular transaction, wherein the particular transaction record is the earliest record received by the single apply process of the particular transaction, and wherein the specific system change number is indicated in the request; and
the single apply process receiving one or more redo records that begins at the start transaction record of the particular transaction from the capture process.

25. The medium of claim 15, wherein the capture process avoids taking checkpoints when capturing the interesting logical change records from one or more logs at the source node.

26. The medium of claim 15, wherein the one or more sequences of instructions further comprise instructions which, when executed by one or more processors, causes the one or more processors to perform:
reestablishing an association between the single apply process and the capture process after the single apply process restarts at the destination node;
sending, by the single apply process, a particular system change number to the capture process, wherein the single apply process retrieves the particular system change number from a persistent data store and wherein the particular system change number indicates the lowest value for all subsequent system change numbers; and
receiving, from the capture process, one or more messages that contain one or more interesting logical change records captured at the source node, wherein each of the one or more interesting logical change records carries a system change number that is no less than the particular system change number.

27. The medium of claim 15, wherein the one or more sequences of instructions further comprise instructions which, when executed by one or more processors, causes the one or more processors to perform:

reestablishing an association between the single apply process and the capture process after the capture process restarts at the source node;

sending a particular system change number to the capture process, wherein the single apply process stores the particular system change number as the lowest value for all subsequent system change numbers; and receiving, from the capture process, one or more messages that contain one or more interesting logical change records captured at the source node, wherein each of the one or more interesting logical change records carries a system change number that is no less than the particular system change number.

28. The medium of claim 15, wherein the step of marking said plurality of logical change records is performed before a transaction that is associated with a message in said stream of messages is consumed at the destination node.

\* \* \* \* \*

UNITED STATES PATENT AND TRADEMARK OFFICE
CERTIFICATE OF CORRECTION

| | | |
|---|---|---|
| PATENT NO. | : 8,799,213 B2 | Page 1 of 1 |
| APPLICATION NO. | : 11/831478 | |
| DATED | : August 5, 2014 | |
| INVENTOR(S) | : Wong et al. | |

It is certified that error appears in the above-identified patent and that said Letters Patent is hereby corrected as shown below:

In the Claims

In column 21, line 27, in Claim 15, before "change" insert -- logical --.

Signed and Sealed this
Third Day of March, 2015

Michelle K. Lee
*Deputy Director of the United States Patent and Trademark Office*